(12) United States Patent
Facey et al.

(10) Patent No.: US 12,208,430 B2
(45) Date of Patent: Jan. 28, 2025

(54) THERMAL REMEDIATION SYSTEM AND PROCESS

(71) Applicant: AGES Thermal Processing Corporation, Red Deer (CA)

(72) Inventors: Roderick Michael Facey, Edmonton (CA); Wade Ralph Bozak, Edmonton (CA)

(73) Assignee: AGES Thermal Processing Corporation, Red Deer (CA)

( * ) Notice: Subject to any disclaimer, the term of this patent is extended or adjusted under 35 U.S.C. 154(b) by 237 days.

(21) Appl. No.: 17/614,475

(22) PCT Filed: May 29, 2020

(86) PCT No.: PCT/CA2020/050744
§ 371 (c)(1),
(2) Date: Nov. 26, 2021

(87) PCT Pub. No.: WO2020/237393
PCT Pub. Date: Dec. 3, 2020

(65) Prior Publication Data
US 2022/0234086 A1    Jul. 28, 2022

Related U.S. Application Data

(60) Provisional application No. 62/880,003, filed on Jul. 29, 2019, provisional application No. 62/853,901, filed on May 29, 2019.

(51) Int. Cl.
*C10B 47/44*   (2006.01)
*B09B 3/40*    (2022.01)
(Continued)

(52) U.S. Cl.
CPC ............. *B09B 3/40* (2022.01); *C02F 11/10* (2013.01); *C10B 5/00* (2013.01); *C10B 13/00* (2013.01);
(Continued)

(58) Field of Classification Search
CPC ................................. C10B 47/44; C10B 7/10
See application file for complete search history.

(56) References Cited

U.S. PATENT DOCUMENTS 1,698,171 A * 1/1929 Reich ...................... C10B 7/10
                                                    202/113
4,308,103 A * 12/1981 Rotter .................... C10B 53/00
                                                    202/265

(Continued)

OTHER PUBLICATIONS

International Search Report issued on corresponding PCT Application No. PCT/CA2020/050744 dated Aug. 25, 2020, 3 pages.

*Primary Examiner* — Jonathan Luke Pilcher
(74) *Attorney, Agent, or Firm* — MBM Intellectual Property Law LLP

(57) ABSTRACT

The present invention provides a system for thermal remediation and/or the processing of a feed materials like contaminated materials, waste polymeric materials, waste paper products, waste wood and biomass. The system comprises at least one thermal screw conveyor provided in a housing under pressure, a first plug screw conveyor in a housing in communication with an inlet of thermal screw conveyor housing and a second plug screw conveyor in a housing in communication with an outlet of thermal screw conveyor housing. The thermal housing is configured to heat the feed material to form one or more vaporized products and a solid residue, wherein one or more vaporized products are removed through the one or more vapor ports provided in the pressure housing, and the solid residue is discharged from an outlet of the second seal-housing.

19 Claims, 5 Drawing Sheets

(51) Int. Cl.
*C02F 11/10* (2006.01)
*C10B 5/00* (2006.01)
*C10B 13/00* (2006.01)
*C10B 19/00* (2006.01)
*C10B 33/02* (2006.01)
*C10B 39/00* (2006.01)
*C10B 49/06* (2006.01)
*B09B 101/75* (2022.01)
*B09B 101/80* (2022.01)
*B09B 101/85* (2022.01)
*B09B 101/90* (2022.01)
*B09C 1/06* (2006.01)
*C02F 101/32* (2006.01)
*E21B 21/06* (2006.01)

(52) U.S. Cl.
CPC ............. *C10B 19/00* (2013.01); *C10B 33/02* (2013.01); *C10B 39/00* (2013.01); *C10B 47/44* (2013.01); *C10B 49/06* (2013.01); *B09B 2101/75* (2022.01); *B09B 2101/80* (2022.01); *B09B 2101/85* (2022.01); *B09B 2101/90* (2022.01); *B09C 1/062* (2013.01); *C02F 2101/32* (2013.01); *E21B 21/063* (2013.01)

(56) References Cited

U.S. PATENT DOCUMENTS

| | | |
|---|---|---|
| 4,738,206 A | 4/1988 | Noland |
| 4,917,023 A | 4/1990 | Jones |
| 5,178,077 A | 1/1993 | Norris |
| 5,188,041 A | 2/1993 | Noland |
| 5,242,245 A | 9/1993 | Schellstede |
| 5,361,514 A | 11/1994 | Lahoda |
| 5,464,503 A * | 11/1995 | Avetisian .............. C10B 47/44 201/3 |
| 5,514,286 A | 5/1996 | Crosby |
| 5,656,178 A | 8/1997 | Marchesi |
| 5,710,360 A * | 1/1998 | Self ..................... A62D 3/40 204/158.21 |
| 5,904,904 A | 5/1999 | Swanson |
| 5,988,947 A | 11/1999 | Bruso |
| 6,146,596 A | 11/2000 | Hill |
| 6,840,712 B2 | 1/2005 | Satchwell |
| 8,444,828 B2 * | 5/2013 | Wolfe .................. F23G 5/0273 201/15 |
| 9,045,693 B2 * | 6/2015 | Wolfe .................. F23G 5/0273 |
| 9,220,798 B2 * | 12/2015 | McKee .................. A61L 2/07 |
| 9,604,192 B2 * | 3/2017 | Tucker ................... C10B 47/44 |
| 10,184,083 B2 * | 1/2019 | Tsoi ...................... C10B 53/07 |
| 10,364,394 B2 * | 7/2019 | Strezov ................. B65G 33/26 |
| 2003/0228196 A1 | 12/2003 | Satchwell et al. |
| 2006/0076224 A1* | 4/2006 | Ku ......................... C10B 47/44 202/262 |
| 2008/0149471 A1* | 6/2008 | Wolfe .................. F23G 5/0273 201/8 |
| 2008/0295356 A1 | 12/2008 | Nickerson |
| 2013/0240343 A1* | 9/2013 | Wolfe ..................... C10B 7/10 202/99 |
| 2014/0175335 A1 | 6/2014 | Anderson et al. |
| 2014/0301934 A1* | 10/2014 | Tucker ................... C10B 47/30 423/445 B |
| 2015/0175888 A1* | 6/2015 | Wolfe ..................... C10B 7/10 201/5 |
| 2015/0175889 A1* | 6/2015 | Wolfe .................... C10B 45/02 201/15 |
| 2015/0275093 A1* | 10/2015 | Tsoi ........................ C10G 1/10 202/113 |
| 2016/0244674 A1* | 8/2016 | Strezov ................. C10B 7/10 |
| 2018/0056262 A1* | 3/2018 | Miller .................... C10K 1/16 |

* cited by examiner

THERMAL REMEDIATION SYSTEM AND PROCESS

FIELD OF THE INVENTION

The invention relates to system and process for the thermal remediation and/or the processing of materials such as oil based drill cuttings, hydrocarbon contaminated soil, slop oil, oily sludges, tank bottoms, residual organic wastes, waste polymeric materials, such as plastic and rubber, and waste wood.

BACKGROUND OF THE INVENTION

Several in-situ and ex-situ technologies have been developed to vaporize contaminants from materials, which include thermal desorption, pyrolysis, or remediation as exemplified by U.S. Pat. Nos. 6,840,712, 5,710,360, 5,656,178, 5,514,286, 5,361,514, 5,242,245, and 5,188,041.

U.S. Pat. No. 12,156,681 presents an indirectly heated screw processing apparatus, wherein heating of the material is accomplished using methods involving a series of rotating helical ducts or hollow flites radial to a shaft.

U.S. Pat. No. 6,840,712 presents a thermal desorption/pyrolysis treatment technique for the removal of contaminants from materials using one or more heated screw conveyors operating in series. Removal of organic and non-organic contaminants from the material is accomplished using one or more thermal screw conveyors operating at two or more temperatures zones. The temperature zones at which the system can operate include low temperature thermal desorption (90 to 316 deg C.), high temperature thermal (316 to 427 deg C.) desorption and pyrolysis (>427 to 649 deg C.). Direct and indirect heating of the feed material in each of the temperature zones is conducted under a vacuum in the presence of an inert, hot, non-condensable gas. In the pyrolysis zone, an organic binder may be added to encapsulate inorganic contaminants such as metals the solid material matrix.

U.S. Pat. No. 6,146,596 presents a method of soil remediation that includes heating and vaporizing contaminated compounds. A blower is used to withdraw the organic hydrocarbon gases and other vaporized contaminants through the Soil and out to the condenser where the compounds are liquified and containerized.

U.S. Pat. No. 5,988,947 presents a multi-chambered soil remediation device that can be adapted to mount to a vehicle wherein each chamber has an inlet, an outlet and a Soil conveyor. The Soil conveyor of one chamber feeds material into the inlet of a Subsequent chamber. The Soil is treated as it is conveyed within the chambers by the injection and removal of materials.

U.S. Pat. No. 5,904,904 presents a thermal desorption treatment technique for the removal of contaminants from particulate material using an inclined rotating drum similar to a rotary dryer or kiln. Removal of the contaminants moving through the system by rotating the kiln is accomplished by vaporizing the components in an air environment by the counter-current flow of air relative to the material employing both direct and indirect heat. The use of air results in the creation of CO and $CO_2$ by oxidation. A burner firing into the center of the drum applies direct heat, and the process temperature is controlled with excess air. Hot products of combustion are passed through a set of fire tubes providing indirect heat to the process.

U.S. Pat. No. 5,710,360 presents a system that employs an inductive heating system tube surrounding a single Screw conveyor for decontaminating materials. The tube is designed to withstand temperatures as high as 982 C. (1800 F).

U.S. Pat. No. 5,656,178 presents a method for the thermal desorption of contaminated materials using Superheated Steam, acidification, and fluidization in a batch process. In this process the Superheated Steam is recycled with any water in the feed material being converted into Superheated Steam.

U.S. Pat. No. 5,514,286 presents a thermal desorption method and apparatus using a vacuum batch process for removing chemical contaminants from Soil. The method employs a vacuum batch process where the vessel is a modification drum of a cement truck with ribbon flights.

U.S. Pat. No. 5,361,514 presents a method that removes Volatile materials by thermal desorption in a controlled oxygen environment by employing a flat type belt conveyor with counter current gas flow over the top of the material on the belt.

U.S. Pat. No. 5,242,245 presents a method and apparatus for vacuum enhanced thermal desorption in a device that employs two concentric rotating cylinders. The contaminated material is desorbed and conveyed parallel to the cylinder axes through the annular space. Heat is supplied to the material from a centrally mounted heat Source located inside the inner cylinder.

U.S. Pat. No. 5,178,077 discloses an apparatus and method for the removal of higher and lower volatility organic contaminants from soil. The apparatus includes an externally heated screw conveyor having one or more solid core flights. The contaminated soil within the screw conveyor is heated to a temperature above which at least one of the contaminants volatilize. The Volatilized contaminants are then vented from the Screw conveyor. External heating is provided by at least one infrared radiation Source external to the Screw conveyer.

One major drawback with the known thermal desorption systems is that obtaining a vapor/gas tight seal during a continuous operation has proven to be problematic. As a result, air is introduced into the system, which results in unwanted oxidation during heating of contaminated materials within the heating chambers of the thermal screw conveyors, even in systems operated under vacuum, which in turn affects the quality of the vaporized products such as recovered oil.

Accordingly, there is a need for improved thermal desorption/thermal remediation system which can provide an effective vapor/gas seal to minimize the introduction of air into the heating chamber, and/or provide improved separation of the vaporized products from the residue.

This background information is provided for the purpose of making known information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a system for thermal remediation and/or the processing of a feed materials, such as contaminated materials, waste polymeric materials, waste paper products, waste wood and biomass.

In accordance with an aspect of the present invention, there is provided a system for thermal remediation and/or the processing of a feed material to obtain one or more vaporized products and a solid residue. The system comprises: a). at least one pressure housing having an inlet end and an outlet end, and equipped with at least one screw conveyor configured to fill, rotate and convey the feed material along the length of the pressure housing, and one or more purge gas connections at or near the inlet end to receive an inert, non-condensable gas at a predefined flow rate to maintain the feed material under low to medium positive pressure, and one or more vapor ports at or near the outlet end; b) one or more heat sources in communication with the pressure housing to directly and/or indirectly heat the feed material within the pressure housing at a predefined temperature; c). first seal-housing having an inlet, and an outlet in fluidic communication with the inlet of the pressure housing, and equipped with a first plug screw conveyor for conveying the feed material towards the outlet end of the seal-housing; d) a second seal-housing having an inlet in fluidic communication with the outlet of the pressure housing, and an outlet for discharging the solid residue, second seal-housing equipped with a second plug screw conveyor for conveying the solid residue towards the outlet end of the seal-housing; and e). a feeder in fluidic communication with the inlet of the first seal-housing; wherein the feed material is converted to the one or more vaporized products and the solid residue in the pressure housing, and wherein one or more vaporized products are removed through the one or more vapor ports of the pressure housing, and the solid residue is discharged from the outlet of the second seal-housing.

BRIEF DESCRIPTION OF THE DRAWINGS

The invention will now be described by way of an exemplary embodiment with reference to the accompanying simplified, diagrammatic, not-to-scale drawings. In the drawings.

DETAILED DESCRIPTION

Figure 1:
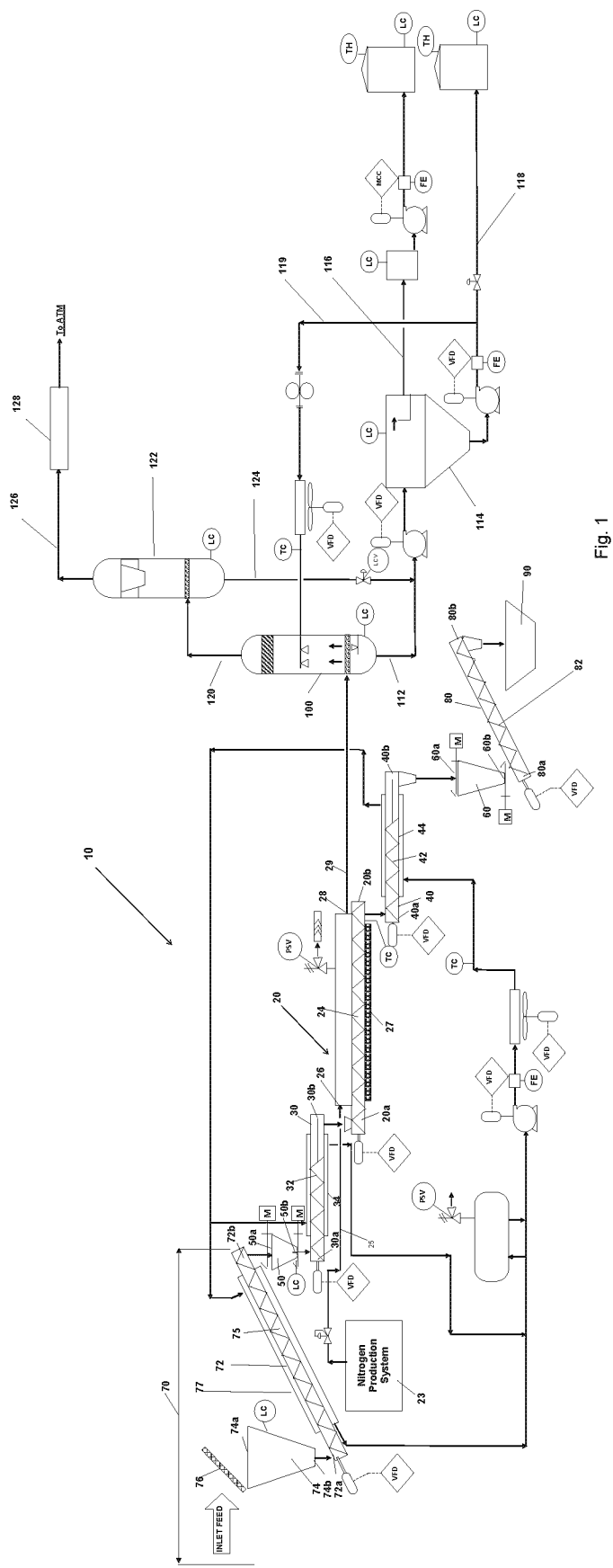
FIG. 1 is a schematic depiction of the system in accordance with an embodiment of the present invention.
Figure 1A:
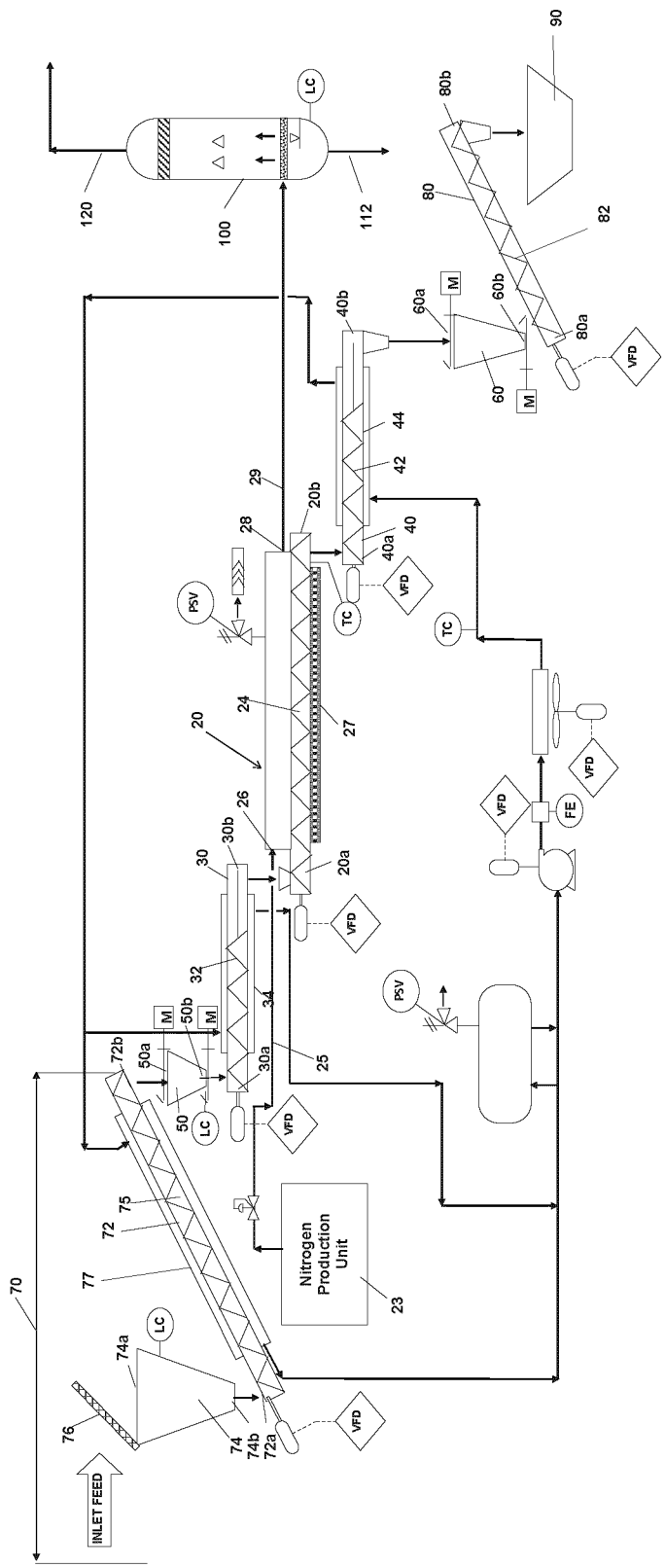
FIGS. 1A and 1B are partial enlarged views of FIG. 1.
Figure 1B:
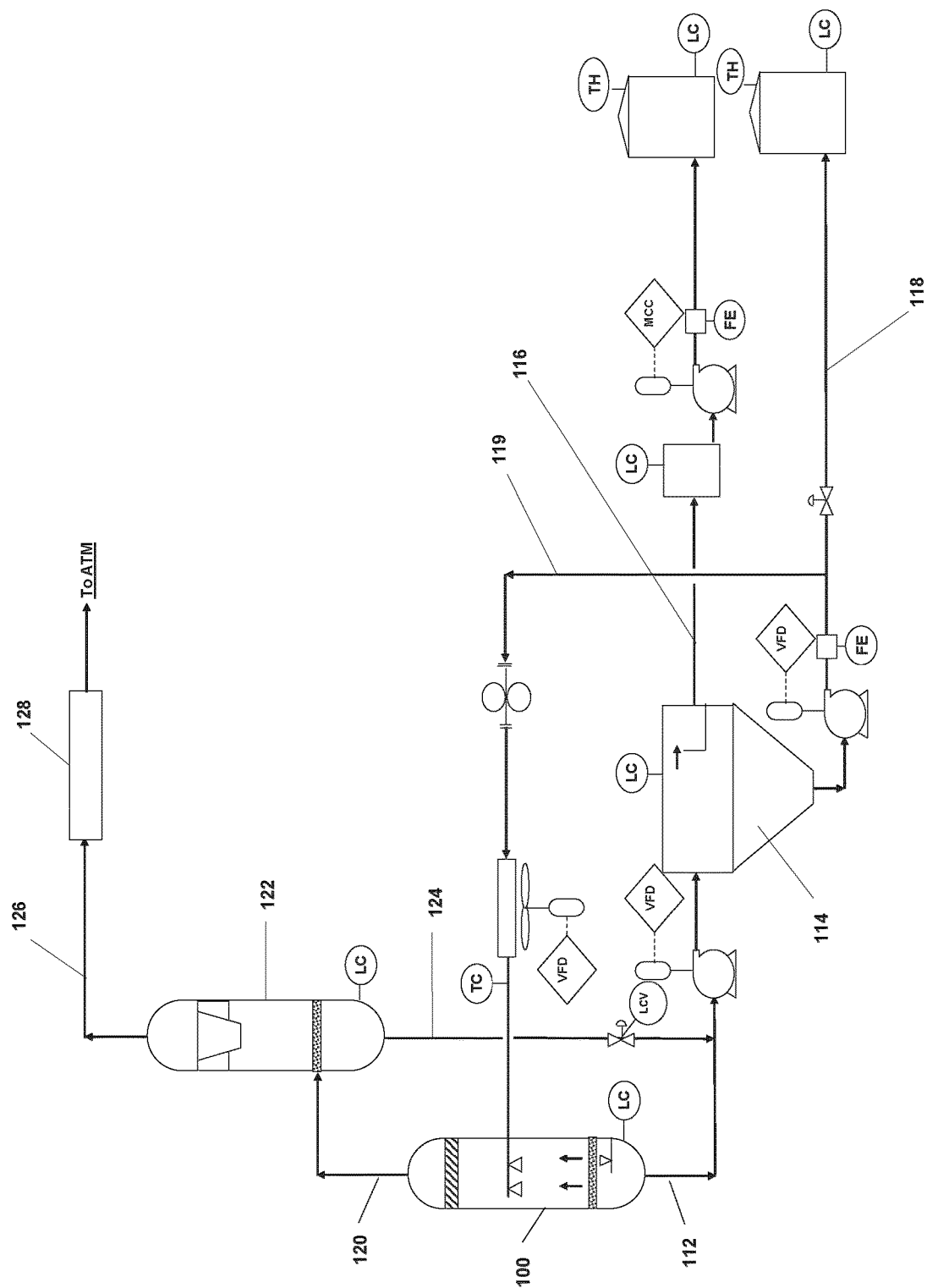

Unless defined otherwise, all technical and scientific terms used herein have the same meaning as commonly understood by one of ordinary skill in the art to which this invention belongs.

The term "thermal remediation" as used herein refers to process for separation of volatile or semi volatile organic and/or inorganic chemicals/substances and water from a feed material with the application of heat sufficient to vaporize the chemicals/substances, which can then be fractionated, condensed and recovered for recycle and reuse as a value added product. The "thermal remediation" process includes "thermal desorption" and "thermal conversion" processes.

The term "feed material" as used herein refers to any feed material suitable for treatment using the system and process of the present invention. These materials include but not limited to contaminated material, waste polymeric material, waste paper products, waste wood and biomass. Non-limiting examples of "contaminated material" include oil based drilling muds, soils, slurries and sludges derived from tank and slop oil operations, and materials obtained from industrial or agricultural waste management. Non limiting examples of "waste polymeric material" include plastic materials from municipal operations and rubber from recycling facilities.

Chemicals/substances present in soil, drilling muds, slurries and sludges, can also be defined as "contaminants" based on whether they exceed the permittable amounts that may be allowed to be present within the solid media/residue that is to be disposed of at facilities such as landfills. The amounts of the chemical species may not be of levels that are toxic, but instead may be in levels or concentrations that result in increased disposal costs of the solid media/material, if disposed of in an untreated manner, or possess economic value with respect to recycle and reuse.

The term "thermal desorption" as used herein includes the processes of removing contaminants from a solid matrix/media with the application of heat sufficient to vaporize the contaminants from the solid matrix to obtain a solid residue for disposal.

The term "thermal conversion" as used herein includes processes for separating organic and/or inorganic chemicals/substances from waste polymeric materials, biomass, waste paper products and waste wood.

The terms "chemical" and "substances" have been used interchangeably herein.

"Organic chemicals/substances" as used herein include volatile, semi-volatile, and non-volatile "hydrocarbons", and "inorganic contaminants as used herein include volatile and non-volatile metals and salts thereof.

The term "hydrocarbon" as used herein refers to compounds consisting of hydrogen and carbon atoms, and compounds consisting primarily of hydrogen and carbon atoms wherein one or more carbon atoms are replaced with heteroatoms, such as O, N, S and P.

The term "inert, non-condensable gas" as used herein refers to a substantially inert gas used for purging one or more screw conveyor housing(s), which is not readily condensed at the system operating temperatures and pressures, and which does not pose a risk of combustion or explosion on heating to the high temperatures of thermal desorption, thermal conversion and/or pyrolysis processes. This may also include a gas that when used will inhibit and prevent the oxidation of volatilized products that are recovered for their economic value. Inert, non-condensable gases can include nitrogen and argon. It may also include light non-condensable gases typical of natural gas such as methane, ethane and propane, injected or derived through operation of the process during recycle, as explained herein. Excluded for use as an inert, non-condensable gas are oxygen-containing gases. Carbon dioxide is not permitted for use as an inert, non-condensable gas in those thermal screw conveyors operating at pyrolysis temperatures.

The term "pyrolysis" as used herein is a thermochemical decomposition process carried out at elevated temperatures in the absence of oxygen.

The term "electric heating elements" as used herein refers to a heating element that converts electrical energy into heat through the process of resistive or joule heating. Electric current passing through the element encounters resistance, resulting in heating of the element. The process is independent of the direction of current flow.

The term "temperature sensor" as used herein includes a temperature probe that can be inserted into the material being heated to measure material temperature, or a heating sensor or a thermocouple mounted on the surface of an object (i.e. housing, piping, etc.).

The term "temperature controller" as used herein includes a programmable computer that can accept an input, for example, temperature readings, from a variety of temperature sensors which will then be used to cycle on-off the electrical energy input into each electric heating element at a frequency required to achieve the screw temperature set-point, while protecting the electrical heating elements from burn out.

The term "screw conveyor" as used herein refers to an auger having a uniform or non-uniform series of flites/flights mounted on a shaft, and adapted to convey and mix solid/semisolid material along its length on rotation. The shaft can be solid or hollow. The screw conveyor may comprise a single auger or multiple augers arranged in parallel. In the case of multiple augers, the flites of each are designed to intermesh with each other such that the combined rotation moves the solid/semi solid material forward along the length of the screw conveyor. Herein, the screw conveyor is also sometimes simply referred to by the term "screw".

The term "housing" for screw conveyor(s) refers to an enclosure provided by the exterior walls, bottom and shell (s), with all inlets, outlets and connections being sealed so as to maintain a gas tight seal under vacuum and/or low to moderate pressure conditions. The housing walls, bottom, and shells can be formed as a unitary body or bolted/welded together.

The term "thermal screw conveyor" refers to a screw conveyor adapted to be heated and/or to be placed in a housing to be heated. In the context of the present invention, the screw conveyor of the pressure housing is a thermal screw conveyor.

The term "plug screw conveyor" refers to a screw conveyor adapted to compress the material while conveying it along its length on rotation, thereby creating plug/seal for vapors.

The term "gate valve" refers to a valve which opens by lifting a gate out of the path of the material. The gate faces can be parallel, but are most commonly wedge-shaped in order to be able to apply pressure on the sealing surface.

The term "knife gate valve" refers to a type of gate valve which is used to slice through the solid or semi-solid material being conveyed. The knife gate valve can be a uni-directional or bi-directional valve.

The present invention provides an improved thermal remediation system that provides and maintains a vapor/gas tight seal in the system during operation.

The present application has established that the placement of a thermal screw conveyor housing between a first plug screw conveyor housing and a second plug screw conveyor housing, and optionally providing an inlet hopper equipped with a gate valve at the inlet of the first plug screw housing, and/or a discharge hopper equipped with a gate valve at the outlet of the second first plug screw housing, surprisingly provides an effective vapor/gas seal for the material being heated under slight to moderate pressure in the pressure housing, while also providing an improved separation of the resulting vaporized products from the remaining solid residue. Moreover direct cooling of the vaporized products swept out from the pressure housing in to a vapor recovery unit prevents fouling during condensation of the vaporized products.

In accordance with one aspect, the present invention provides a system for thermal remediation of a feed material to obtain one or more vaporized products and a solid residue. The system comprises at least one pressure housing having an inlet end and an outlet end. The pressure housing is equipped with at least one screw conveyor configured to rotate and convey the feed material along its length. The pressure housing also has one or more purge gas connections at or near the inlet end to receive an inert, non-condensable gas at a predefined flow rate to maintain the feed material under low to medium positive pressure, and has one or more vapor ports at or near the outlet end. One or more heat sources are provided in communication with the pressure housing to directly and/or indirectly heat the feed material within the pressure housing at a predefined temperature. The system further comprises a first seal-housing equipped with a first plug screw conveyor for conveying the feed material along its length, and a second seal-housing equipped with a second plug screw conveyor for conveying the solid along its length. The first seal-housing has an inlet, and an outlet in fluidic communication with the inlet of the pressure housing, and the second seal-housing has an inlet in fluidic communication with the outlet of the pressure housing, and an outlet for discharging the solid residue. A feeder system is provided in communication with the inlet of the first seal-housing. In this system, the feed material is converted to one or more vaporized products and the solid residue in the pressure housing, the one or more vaporized products are removed through the one or more vapor ports of the pressure housing, and the solid residue is discharged from the outlet of the second seal-housing.

In some embodiments, the pressure housing is maintained at a pressure up to about 110 kPa. In some embodiments, the pressure housing is maintained at a pressure about 100-105 kPa. In some embodiments, the pressure housing is maintained at a pressure about 101 kPa.

In some embodiments, the system further comprises an input hopper having an inlet portion to receive the feed material from the feeder system, and an outlet portion in communication with the inlet of the first seal-housing.

In some embodiments, the input hopper is equipped with a first gate isolation valve at the inlet portion, and a second gate isolation valve at the outlet portion to prevent admission of air into the system. The isolation valves of the input hopper are configured to alternate in operation, such that when the inlet valve is open and the inlet hopper is being filled, the outlet valve is closed, and when the outlet valve is open, and the hopper transfers the feed material into the inlet of the first seal-housing, the inlet valve is closed. In some embodiments, the first and/or second gate isolation valves are knife gate isolation valves. These hoppers can be purged with a non-condensable inert gas during material transfer and hopper filling to minimize the introduction of air into the process.

The input hopper is sized to continuously feed the feed material into the first seal-housing. Alternatively, in some embodiments comprising the gate isolation valves, the input hopper is configured to be periodically refilled while operating the gate valves to achieve the gas tight seal within the system, during which time the hopper will be isolated from the first seal housing through the closing of the hopper outlet gate isolation valve designed to maintain the gas tight seal. In some embodiments, the plug screw conveyor can be reduced in speed to temporarily slow down the processing capacity of the plug screw conveyor while the inlet hopper is being refilled. Once the hopper has been refilled, the inlet gate valve of the hopper will close, followed by the opening of the outlet gate valve of the hopper allowing the hopper to once again continuously feed the feed material into the first seal-housing. The process of refilling the inlet hopper is can be achieved in a short time period to avoid having to shut down the plug screw.

In some embodiments, the system further comprises a discharge hopper having an inlet portion in communication with the outlet of the second seal-housing and an outlet portion to discharge the solid residue. In some embodiments, the discharge hopper is equipped with a first gate isolation valve at the inlet portion, and a second gate isolation valve at the outlet portion to prevent the admission of air into the system. The isolation valves of the discharge hopper are configured to operate in alternation, such that when valve at the inlet portion is open and the discharge hopper is being filled with the solid residue, the outlet valve is closed. When the outlet valve is open and the hopper is discharging the solid residue, the inlet valve is closed. In some embodiments, the first and/or second gate isolation valves are knife gate isolation valves.

In some embodiments, the input hopper is equipped with a level control element to control opening and closing of the inlet and outlet isolation valves of the input hopper. In some embodiments the discharge hopper is equipped with a level control element to control the opening and closing of the inlet and outlet isolation valves of the discharge hopper. In some embodiments the hoppers are equipped with purge gas connections to permit purging of the hoppers during material transfer and filling with a non-condensable inert gas, such as nitrogen, to minimize the introduction of air into the process.

The plug screw conveyors of the first seal-housing and/or the second seal-housing are configured to independently compress the material being conveyed into a dense mass, which in turn creates a vapor/gas tight seal at the outlet of their respective housing, and prevents vapors from escaping the pressure housing. Such a configuration can be achieved via different ways depending upon one or more parameters selected from: contaminant material composition with respect to moisture content; configuration of input hopper; rotational speed of the plug screw conveyor(s); capacity requirement; type of motor; and/or speed of drive (single or variable speed drive) for plug screw conveyor rotation(s).

A plug screw conveyor can be configured to compress the conveyed material by shortening of flight-pitch towards the outlet end of the auger (e.g. flight-pitch can be reduced by half relative to the pitch at the beginning of the auger); by increasing flight-angle towards the outlet end of its auger (e.g. from about 45 degrees towards the inlet end to near vertical at the outlet end); by removing a portion of the flights towards the end of its auger; by using a variable speed drive capable of adjusting the torque and force that the screw applies against the conveyed material; by varying the diameter of the auger (e.g. the diameter can be increased towards the end of the auger), or a combination thereof.

In some embodiments, the first and/or second seal-housing has a plug screw conveyor wherein a portion of the flights toward the outlet end has been removed. An appropriate length "A" of the portion of auger of the plug screw conveyor with no-flites can be calculated based on the diameter of the seal-housing, and the angle of repose of the material within the housing. For example, if the diameter of the plug screw housing is defined as "D" and the angle of repose for a particular material is defined as "B", then the following equation (I) can be used to calculate the length "A":

a. $A \geq D/\tan(B)$          (I)

This calculation is used to ensure that enough flights are removed so that the angle of repose still has the material base in the auger so that it has to physically push itself to the exit thus creating the plug. In some embodiments, the first seal-housing and/or the second seal-housing is equipped with a stationary scraper bar to remove compacted/compressed material from the plug screw flites at the respective outlet.

In some embodiments, the first seal-housing and/or the input hopper are wrapped with a jacket configured to receive a heating medium, or with one or more electric heating elements configured to pre-heat the feed material at a temperature lower than the temperature of the pressure housing.

In some embodiments, the second seal-housing and/or the discharge hopper are wrapped with a jacket configured to receive a cooling medium to cool the solid residue. Examples of such cooling medium include water, glycol, thermal oil or a mixture thereof.

In some embodiments, the first seal-housing and/or the second seal-housing are equipped with inlet purge gas connection(s), optionally configured to create a pressure gradient from the inlet end to the outlet end of the pressure housing.

In some embodiments, the input hopper is equipped with an inlet purge gas connection to permit pressurizing the input hopper to a specified operating pressure. This inlet pressure source can be used to create a pressure gradient from the input hopper to the outlet of the pressure housing and/or to the outlet of the discharge hopper.

In some embodiments, the input hopper and the discharge hopper are both equipped with purge connections.

In some embodiments, the input hopper and/or the discharge hopper is further equipped with a pressure safety valve or regulator to provide overpressure protection.

The system further comprises a discharge screw conveyor provided within a discharge screw conveyor housing having an inlet in communication with the outlet of the discharge hopper and an outlet for discharging the solid residue.

In some embodiments, the feeder system comprises a feed screw conveyor provided within a feed screw conveyor housing, and a feed material feed-receiving hopper. The feed screw conveyor housing has an inlet, and an outlet in communication with the inlet portion of the input hopper, and the feed material feed-receiving hopper is in communication with the inlet of the feeder screw conveyor housing.

The auger flight pitch design and pressure housing is designed to operate at a carrying utilization capacity from between 50% to 80% full, in order to maximize heat transfer via indirect heating through the walls thereof. The flights on the screw conveyor of the pressure housing are configured to convey, lift and mix the material, to continuously expose fresh material to the inside wall of the pressure housing to facilitate indirect heating. The flights are also configured to convey the material in a forward direction while maintaining a material level across the screw cross-section. In the embodiments of the pressure housing comprising two or more screw conveyors, the flights on the shaft of each screw conveyor are designed to be intermeshed so as to be self-cleaning and to prevent material accumulation from adhering to the augers.

In some embodiments, the screw conveyor of the pressure housing has uniform flight pitch. In some embodiments, the screw conveyor of the pressure housing has variable pitch near the outlet end thereof. In some embodiments, the screw conveyor of the pressure housing has variable pitch near the inlet thereof.

In some embodiments, the plug screw conveyor of the first seal-housing and/or the second-seal housing has variable flight pitch towards the respective outlet end thereof.

In some embodiments, the feed screw conveyor has variable flight pitch near the inlet end thereof.

The pressure housing can be formed by bolting/welding the bottom, walls and shell together, or formed as a unitary body to avoid the issue of leaking gaskets caused by cyclic thermal expansion and contraction. Connection of the components comprising the hoppers, isolation valves and screw conveyors is preferably, achieved by flange and/or welded connection.

In some embodiments, a portion of screw conveyor of the pressure housing extends out from the inlet and/or outlet ends of the housing. In such embodiments a sealing system is provided to maintain gas/vapor seal between the housing and the extended conveyor portion(s). The sealing system has an inlet for receiving an inert non-condensable gas (i.e. purge gas). In case seal provided by the sealing system fails, the purge gas can be flown/purged into the pressure housing to maintain gas/vapor seal, thereby avoiding system leak to the atmosphere. The purge gas is derived from a nitrogen production system.

In some embodiments, the knife gate isolation valves on the input and discharge hoppers are flange connected. The knife gate isolation valves can be automated for open or close operation. The actuators that control the opening and closing of the valves can be powered using the purge gas system, instrument air or electric motor operation.

In some embodiments, the inlets and/or outlets of the input hopper and/or discharge hopper have rectangular openings. In some embodiments, the width of the opening is approximately ⅔ times the width of the plug screw conveyor diameter, while the length of the opening should is approximately 1.5 times width of the opening.

In some embodiments, the pressure housing is configured to be heated to a temperature from about 230° C. to about 670° C.

In some embodiments, the one or more heat sources for direct heating of the feed material in the pressure housing are one or more hot inert gases being injected into the pressure housing.

In some embodiments, the one or more heat sources for indirect heating of the feed material in the pressure housing are one or more electric heating elements placed inside and/or on the outer surface of the pressure housing.

In some embodiments, electric heating elements are arranged in groups allowing the electric heating elements to be operated at different temperatures along the length of the pressure housing. This arrangement can permit greater heat addition at the front end of the pressure housing to account for the loss of heating in the back end of the pressure housing. The electrical heating elements can be configured with their own individual temperature controller complete with surface mounted temperature elements on the pressure housing designed to measure and monitor the housing skin temperature which in turn is used to regulate the amperage flow to each electric heating element.

In some embodiments, the system comprises a heating element control system wherein the electric heating elements are designed with sufficient resistance to produce heat, when the heating element control system cycles on and off a current flow of each electric heating element at a rate not to exceed the element rated capacity and to avoid the heating elements from remaining fully energized and leading to burn out of the elements.

In some embodiments, to prevent heat loss, the pressure housing is insulated and cladded using high temperature rated insulation and metal cladding designed for the operating temperatures.

In some embodiments, the pressure housing is partitioned to form two or more separate temperature zones along its length such that the temperature of each successive temperature zone can be maintained at a temperature which is equal to or greater than that of the previous temperature zone. In some embodiments, the pressure housing can be partitioned to create zones to achieve low temperature thermal remediation only, low and high temperature thermal remediation, low and high temperature thermal remediation, and pyrolysis. The operating conditions can be selected depending on the type of feed material, its moisture content, type of contaminates to be removed, types of vaporized products to recovered. In some embodiments, the separate temperature zones are achieved by providing at least two pressure housings adapted to feed the feed material sequentially from one housing to the next housing, and each housing forming one of the separate temperature zones.

To avoid liquid flowing through the pressure housing to its outlet, the pressure housing is preferably sloped towards its inlet by a minimum of about 0.5 to about 1.0 percent.

The system of the present invention further comprises a vapor recovery system operatively connected with the vapor outlet ports of the pressure housing to receive and condense the one or more vaporized products.

In some embodiments, the vapor recovery system comprises a direct spray condenser connected to the vapor port(s) via vapor recovery line(s).

The spray condenser can be horizontal or vertical in orientation, preferably vertical, and may be baffled or contained a packed column.

In some embodiments, the direct spray condenser is positioned such that the vapor recovery line(s) descends or slopes towards the spray condenser.

In some embodiments, the vapor recovery system comprises a vertical direct spray condenser configured to spray liquid cooling medium, which is injected into the condenser vessel through a series of spray nozzles designed to produce a fine spray of liquid with a long enough residence time of liquid droplets in the vessel, whereby contact with the hot vaporized products causes the condensable vaporized products and water vapors to condense, producing an oil-water mixture in the bottom reservoir of the spray condenser. The oil-water mixture is removed from the spray condenser and directed into the oil-water separator via an oil-water recovery line. The separated oil from the oil-water separator is recovered via oil-recovery line, and the separated water can be recovered and/or circulated to the spray condenser recirculation line.

In some embodiments, the liquid cooling medium is water or water treated with a base such as sodium bicarbonate or sodium hydroxide. In such embodiments, the condenser is connected with a chemical feed tank and injection pump designed to add the base directly to the cooling water. The base in the cooling water can be used to neutralize the acidity in the condensed oil or distillate within the direct spray condenser through the action of a water wash.

In some embodiments, the condenser is connected with a chemical injection system, which can be used to inject one or more demulsifiers or defoamers into the cooling water to prevent foaming in the direct spray condenser.

Direct cooling of the vaporized products obtained from the pressure housing can: (1) prevent fouling within the condenser, (2) provide base washing of the oil or distillate to reduce its acidity, and/or (3) wash the oil and distillate to remove and partition to the cooling water phase contaminates such as fine solids and inert pollutants.

In some embodiments, the vapor recovery line that conveys the hot vaporized products from the pressure housing to the direct spray condenser is wrapped with electric heating elements, to minimize condensation within the vapor recovery line that may lead to fouling and eventual plugging of the line.

The condenser further comprises a gas recovery line to withdraw non-condensable gases from the direct spray condenser into a gas-liquid separator/coalescer vessel, and an oil-water recovery line for withdrawing the oil-water mixture produced through direct cooling of the vaporized products and water vapor from the direct spray condenser into an oil-water separator.

The gas-liquid separator is designed to remove and recover as a liquid stream any liquid droplets that may be entrained in the gas stream that exists the direct spray condenser. Liquid droplets are removed via a centrifugal gravitational forces designed to coalesce the droplets whereby they can be recovered as a liquid for discharge into the oil-water separator. The recovered liquid exits the vertical gas-liquid separator via the oil-water recovery line, wherein the liquid flow can be controlled using a level control configured to open and close based on level within the gas-liquid separator.

In some embodiments, one or more magnet ionizers are provided on the outer side of the oil-water recovery line to facilitate further separation of oil from water.

In some embodiments, the gas-liquid separator comprises a cyclone separator.

The gas-liquid separator can be connected to a carbon filter and/or a catalytic oxidizer via an exit line, such that non-condensable gases, following removal of any residual liquid droplets from within the gas stream, exits from the gas-liquid separator, and carried via the exit line into the carbon filter and/or to the catalytic oxidizer. The carbon filter can comprise an activated carbon bed designed to remove any odor causing compounds from the gas stream prior its discharge into the atmosphere.

In some embodiments, a gas-liquid scrubber is provided before the carbon filter and/or the catalytic oxidizer.

Removal of any entrained liquid droplets within the gas stream prior to passage of the gas through the carbon filter is avoids high pressure drops within the system. Liquid droplets that that are removed by centrifugal gravitational forces within the gas-liquid separator are collected in the bottom of the vessel, from where the liquids can gravity drain back into the sump of the direct spray condenser or alternatively directly into the inlet of a transfer pump for transfer into the oil-water separator vessel.

In some embodiments, the system further comprises one or more control elements configured to control one or more operational parameters, such as rotational speed of the one or more screw conveyors; direction of rotation of the one or more screw conveyors; temperature of the first seal-housing, input hopper, pressure housing, second seal-housing, and/or the discharge housing; pressure of the first seal-housing, input hopper, and pressure housing, second seal-housing, and/or the discharge housing.

In some embodiments, the system comprises a two-part control system. The first part of the control system is designed to balance the feed throughput through stages of the process. The control system compares temperature readings along the pressure housing with respect to its operating set-points to control the rotational speed of each conveyor in relation to each other based on each unit's design conveyance capacity. The control system (program) can be designed to synchronize each conveyor with respect to each other to avoid overfilling and plugging of a screw conveyor. The second part of the control system is designed to control the oil/water interface within the oil-water separation unit. The oil/water interface system is designed to control the flow rate of the cooling water pump and the addition of make-up as required to maintain the oil/water interface level at a constant level. The operator can set the desired oil layer allowed to accumulate in the top of the oil-water separator. This control system is designed to produce a recovered oil that satisfies a basic sediment and water content of 1% by weight or less, preferably less than 0.5% by weight of the recovered oil. This control system is deemed critical to successful operation in the treatment of the feed material and in the producing an oil of a quality suitable for recycle and reuse.

All screw conveyor motors are to be variable frequency drive controlled. This includes: feed screw conveyor, first seal-housing plug screw conveyor, screw conveyor of pressure housing, second seal-housing plug screw conveyor, and discharge housing conveyor. This allows adjusting the auger speed of each conveyor to balance the feed throughput through the system.

In some embodiment, the feed screw conveyor is designed to operate faster than the plug screw conveyor of the first seal housing to facilitate the rapid periodic loading of the input hopper, while allowing the pressure housing to operate continuously while maintaining a gas tight seal on the system.

In some embodiments, the pressure housing screw conveyor, the first seal-housing plug screw conveyor and the second seal-housing plug screw conveyor are programmed to slow down to their minimum operating speed during time periods when the input and discharge hoppers are being filled or emptied. The closing of the outlet valve on the input hopper or the closing of the inlet valve on the discharge hopper would initiate an automatic slowdown in the auger speed of the plug screw conveyors and pressure housing screw conveyors. This is to avoid material compression and binding in the pressure housing while the hoppers are being filled or emptied.

In some embodiments, the purge gas is stepped down in pressure using two regulators in series before being introduced in to the input hopper and the pressure housing. The purge gas flow rate and pressure shall be sufficient to keep the oxygen levels within the pressure housing to under 0.5% by volume. The step down pressure will be a value sufficient to overcome the system head losses with the vapor collection piping and treatment system.

In some embodiments, the purge gas supply is obtained from a nitrogen production system. The purge gas system is designed to maintain an inert environment within the pressure housing, and purge and convey the vaporized products out of the pressure housing via vapor port(s).

In some embodiments, the purge gas used to sweep of the seal housings, pressure housing, and discharge hopper is preheated to the operating temperature of the pressure housing. This is to avoid the purge gas from condensing any vapors back into the treated solids to re-contaminate the treated solids. The purge gas added to the input hopper is not heated to avoid heating and vaporization of the contaminants within the feed material in the inlet hopper. This is to avoid emission issues in the opening of the inlet valve of the inlet hopper.

In some embodiments, the system of the present invention is for thermal desorption of a feed material to obtain substantially clear solid residue for easy disposal, and optionally recover vapor products.

In some embodiments, the system of the present invention is for thermal conversion of an organic material such as wood, paper products, and plastic and/or rubber materials to recover valuable organic chemicals such as hydrocarbons, and synthetic oil.

To gain a better understanding of the invention described herein, the following examples are set forth. It will be understood that these examples are intended to describe illustrative embodiments of the invention and are not intended to limit the scope of the invention in any way.

EXAMPLES

FIG. 1 is a schematic depiction of an embodiment of the system 10 of the present invention for thermal remediation of a feed material to obtain one or more vaporized products and a solid residue. The system includes a pressure housing 20, a first seal-housing 30, a second seal housing 40, an input hopper 50, a discharge hopper 60, a feeder system 70, and discharge screw housing 80.

The pressure housing 20 has an inlet end 20a and an outlet end 20b. The first seal-housing 30 has an inlet 30a and an outlet 30b in fluid communication with the inlet 20a of the pressure housing. The second seal housing has an inlet 40a in communication with the outlet 20b of the pressure housing and an outlet 40b.

The pressure housing 20 in this example comprises a trough portion defined by the side walls and the bottom of the housing, which is equipped with at least one screw conveyor 24 configured to rotate and convey the feed material and the solid residue along the length of the pressure housing. At least a portion of the roof of the housing is raised/spaced away from the screw conveyor to define a hood portion to provide space for vapor products.

The pressure housing also has one or more purge gas connections 26 near the inlet end to receive nitrogen gas from a nitrogen production system 23 via connection line 25, at a predefined flow rate to maintain the feed material under low to medium positive pressure, and to sweep the vaporized products. The pressure housing further has one or more vapor ports 28 near the outlet end.

The purge gas minimizes admission of air into the pressure housing and sweeps the vapor space of the housing to provide a driving force for the vaporized products to exit the pressure housing via vapor port(s) 28.

One or more electric heating elements 27 are provided in communication with the outer surface of the at least a portion of the trough region of the pressure housing to indirectly heat the feed material within the pressure housing at a predefined temperature to vaporize target chemicals and substances. The one or more electric heating elements can be connected to a temperature indicator controller (not shown) designed to control the operating temperature.

The first seal-housing 30 is equipped with a plug screw conveyor 32 configured to compress the feed material while conveying same along its length towards the outlet 30b, to create a vapor/gas tight seal to prevent escaping of volatized products from the pressure housing back into the seal housing, and to prevent to prevent entry of atmospheric air into the pressure housing. The first seal housing is also wrapped by an optional heating jacket 34 configured to receive a heating medium to pre-heat the feed material to a temperature lower than the operating temperature of the pressure housing.

The second seal-housing 40 is equipped with a plug screw conveyor 42 configured to compress the solid residue while conveying same along its length towards the outlet 40b, thereby to create a vapor/gas tight seal, to prevent escaping of vaporized products from the pressure housing into the second-seal housing, and to prevent entry of atmospheric air into the pressure housing. The second-seal housing is also surrounded by a cooling jacket 44 configured to receive a cooling medium to indirectly cool the solid residue.

The input hopper 50 has an inlet portion 50a, and an outlet portion 50b in communication with the inlet 30a of the first seal-housing. The input hopper is configured to continuously feed the feed material into the first seal-housing. Optionally, the inlet portion and the outlet portion of the input hopper each are provided with knife gate isolation valves (not shown). The isolation valves of the input hopper are configured to alternate in operation, such that when inlet valve is open while the inlet hopper is being filled, the outlet valve is closed, and when the outlet valve is open, the inlet valve is closed, while the hopper transfers the feed material into the inlet of the first-seal housing The discharge hopper 60 has an inlet portion 60a in communication with the outlet 40b of the second seal-housing 40, and an outlet portion 60b. The inlet portion and the outlet portion of the discharge hopper are also optionally provided with knife gate isolation valves (not shown), which are also configured to alternate in operation.

The feeder system 70 is provided to feed a feed material into the input hopper 50. The feeder system 70 comprises a feed screw conveyor housing 72, a feed material feed-receiving hopper 74 and a screen 76. The feed screw conveyor housing 72 has an inlet 72a, and an outlet 72b in communication with inlet 50a of the input hopper 50, and the feed material feed-receiving hopper 74 has an inlet 74a to receive the feed material and an outlet 74b in communication with inlet 72a of the feeder screw conveyor housing 72. The feed screw conveyor housing is equipped with screw conveyor 75.

The feed screw conveyor housing 72 is wrapped by an optional heating jacket 77 configured to receive a heating medium to pre-heat the feed material to a temperature lower than the operating temperature of the pressure housing.

The outlet of the discharge hopper 60 is in communication with inlet 80a of the discharge screw conveyor housing 80 equipped with a screw conveyor 82, and a discharge bin 90 is provided in communication with outlet end 80b of the conveyor housing 80.

The system further comprises a direct spray condenser 100 in communication with vapor outlet port(s) 28 via vapor recovery line(s) 29 to receive, cool and condense the vaporized products removed from the pressure housing to form an oil-water mixture. The direct spray condenser 100 is further connected to cyclone separator 113 via conduit 112, and to an oil-water separator 117 via a conduit 114.

In operation, a feed material is deposited onto the screen 76, designed to remove oversized material typically greater than 2 inches. Oversize material gravity discharges from screen 76, and the remaining feed material enters feed hopper 74. From the feed hopper 74 the feed material, enters into feed screw conveyor housing 72 via the inlet 72a, and conveyed by the feed screw conveyor 75 to the outlet end 72b, and then fed into the input hopper 50, wherein the knife gate isolation valves (if present) alternate in operation to prevent admission of air into the system, while feeding the feed material to the first-seal housing 30.

The plug screw 32 of the first seal-housing 30 compresses feed material while conveying it towards the outlet end 30b, thereby creating a vapor/gas tight seal to prevent the escape of volatized products from the pressure housing back into the first seal housing.

The feed material then leaves the first seal-housing via outlet 30b, and enters the pressure housing 20 via inlet 20a, wherein it is heated at a predefined temperature to form vaporized products and a solid residue.

The screw conveyor 24 of the pressure housing conveys the solid residue towards outlet 20b, which is then fed to the second-seal housing 40 via inlet 40a, and the vaporized products are removed via the vapor port(s) 28 from the system under pressure using the inert, non-condensable sweep gas. The plug screw conveyor 42 of the second seal-housing compresses the solid residue while conveying same towards outlet 40b thereof, thereby creating a vapor/gas tight seal.

The vaporized products are removed from the pressure housing via the vapor recovery line(s) 29 and directed to direct spray condenser 100, wherein the vaporized products together with the inert, non-condensable sweep gas are directly cooled using cooling water, causing the condensable vaporized volatile organics in the vapor stream to condense producing an oil-water mixture. The oil-water mixture is removed from the lower end or bottom of the spray condenser via an oil-water recovery line 112 and is directed into the oil-water separator 114. The separated oil from the oil-water separator is recovered via oil-recovery line 116, and the separated water can be recovered via recovery line 118 and/or circulated to the spray condenser 100 via recirculation line 119.

The non-condensable gases including the inert sweep gas exits through the top of the direct contact spray condenser 100 via line 120 where it enters into a vertical gas-liquid separator 122. The vertical gas-liquid separator is designed to remove and recover as a liquid stream any liquid droplets that may be entrained with the gas stream that exits out through the top of the direct spray condenser. Liquid droplets are removed via centrifugal gravitational forces designed to coalesce the droplets whereby they can be recovered as a liquid for discharging into the oil-water separator 114. The recovered liquid exits from the bottom of the vertical gas-liquid separator via oil-water recovery line/conduit 124 whereby the liquid flow is controlled using a level control valve on conduit 124 configured to open and close based on level within the gas-liquid separator 122. The non-condensable gases, following removal of any residual liquid droplets from within the gas stream, exits through the top of the vertical gas-liquid separator 122 where the gases are carried via conduit 126 into the carbon filter and/or a catalytic oxidizer 128. The carbon filter consists of an activated carbon bed designed to remove any odor causing compounds from the gas stream prior its discharge into the atmosphere.

The system is further provided with one or more safety pressure valves (PSV), temperature controls (TM), motor operated valves (M), level controls (LC), level control valves (LCV), motor control centers (MCC), flow elements (FE), and variable speed drives (VFD) for one or more of the crew conveyors used in the system.

Figure 2:
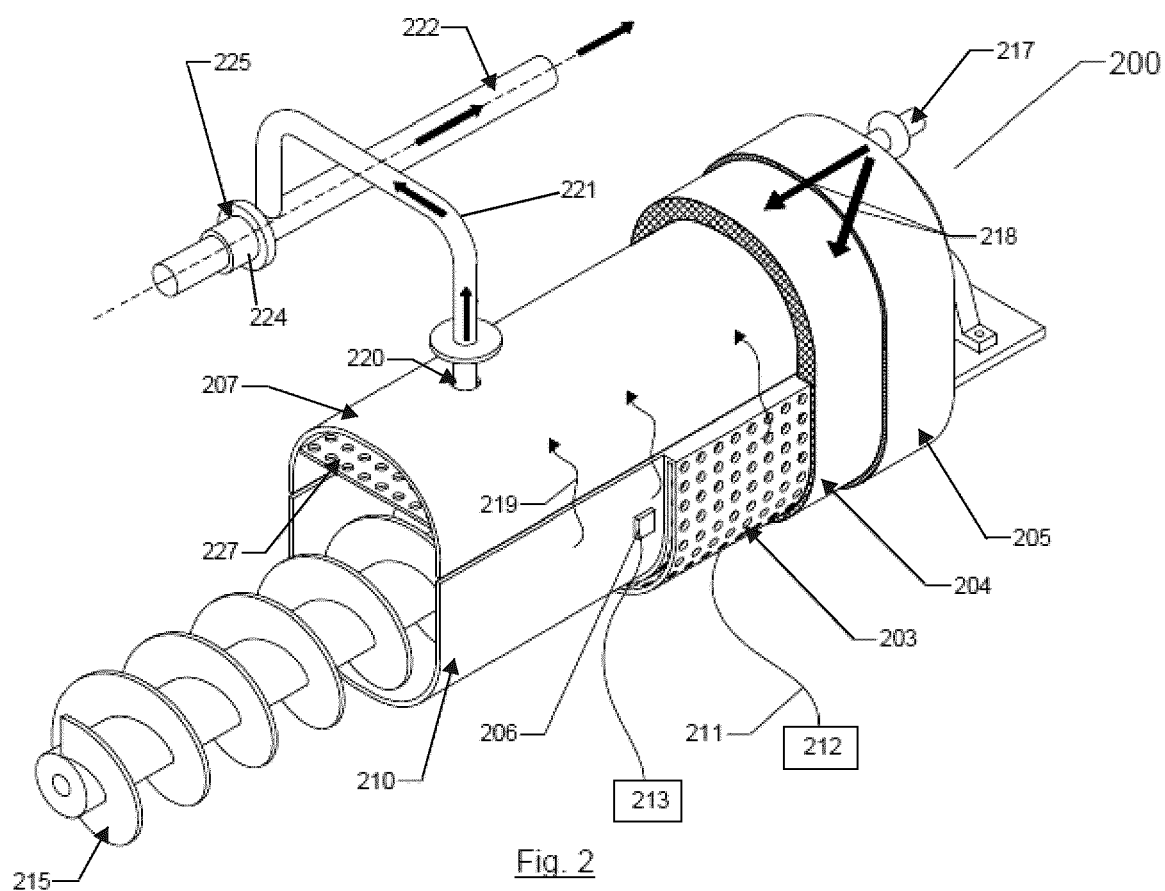
FIG. 2 is a partial cut-away, schematic view of pressure housing in accordance with an embodiment of the present invention.

FIG. 2 is a partial cut away schematic view of an exemplary pressure housing 200 (aka thermal screw housing) suitable for use in the system of the present invention. The pressure housing has a hood portion 207 and a trough portion 210 provided with a screw conveyor 215. Attached to the trough portion 210 are individual electric heating elements 203. The electric heating elements are connected via wires 211 to power unit 212 that cycles on-off the power to the elements and controls the amperage flow to each electric heating element. Located under each electric heating element 203 is a temperature skin surface sensor 206. This temperature sensor measures the trough metal temperature and is used as the process variable in the temperature indicator controller 213 that controls the power unit 212 to the electric heating elements 203. Covering the electric heating elements 203 are a minimum of four inches of high temperature insulation 204 which in turn is covered with a metal cladding 205. The hood portion 207 of the housing 200 is also covered with high temperature insulation 204 which in turn is covered with the metal cladding 205. Electric heating elements can also be attached to the outside of the hood 207 to prevent cooling of gases and to avoid issues related to fouling.

FIG. 2 also showing the inlet and outlet gas openings, gas/vapor collection piping, compartmental sections and internal screens. The hood portion 207 encompasses the vapor space of the housing wherein the vaporized products would concentrate. The hood portion 207 is equipped with multiple inlet and outlet connections. Located on the end wall of the hood 207 at the housing is an inlet connection 217 which is used to inject a hot or cold, inert, non-condensable gas 218, also known as a purge gas, into the headspace/vapor space of the pressure housing designed to sweep out vaporized products from the pressure housing operating at low to moderate pressures. Vaporized products 219 together with the purge gas 218 exit the hood portion 207 of the housing 200 via outlet(s) 220. These outlet(s) 220 convey the vaporized products and purge gas via lateral lines 221 into a common collection manifold 222. The lateral lines 221 and common collection manifold 222 have heating elements (not shown), insulation 224 and are covered with metal cladding 225 to prevent condensation within the pipes, which if allowed to occur can cause fouling. The hood portion 207 can be constructed in sections, where the sections can be bolt or weld connected to each other and to the trough portion 210 of the housing 200. In an alternative configuration, the hood and trough portions are made as unitary body. The hood portion 207 can be fitted with internal screens 227 to reduce particulate carry through with the vaporized contaminants to the outlets 220.

Figure 3:
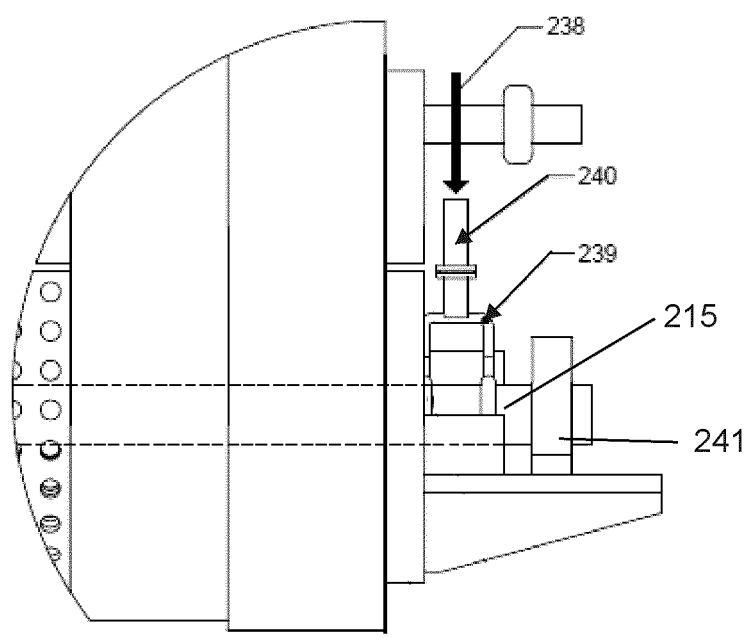
FIG. 3 is partial enlarged side view of FIG. 2.

FIG. 3 is a partial enlarged side view of FIG. 2, showing a portion of the screw conveyor 215 extending out from the front end of the pressure housing, wherein a gas tight seal is provided by a sealing system comprising a seal housing 239 and a bearing housing 241. Inert, non-condensable gas 238, also known as purge gas, enters the seal housing 239 via conduit 240 to pressurize the housing to low to moderate pressures. In case of seal failure, the purge gas will flow into the pressure housing 200 to avoid a system leak to the atmosphere. The purge gas 238 is derived from a nitrogen production system (not shown).

All publications discussed in this specification are indicative of the level of skill in the art to which this invention pertains. To the extent they are consistent herewith, all publications mentioned in this specification are herein incorporated by reference. No admission is made that any cited reference constitutes prior art.

Although the foregoing invention has been described in detail by way of illustration, for purposes of clarity and understanding it will be understood that certain changes and modifications may be made without departing from the scope or spirit of the invention as defined by the following claims:

The invention claimed is:

1. A system for thermal remediation of a feed material to obtain one or more vaporized products and a solid residue, the system comprising:
   a) at least one pressure housing (20) having an inlet end (20a) and an outlet end (20b), the pressure housing having a roof, and a trough portion defined by side walls and the bottom of the housing, and equipped with:

at least one screw conveyor (24) configured to rotate and convey the feed material along the length of the pressure housing, wherein at least one screw conveyor is provided in the trough portion, and at least a portion of the roof is raised/spaced away from the screw conveyor to define a hood portion defining headspace/vapour space for the vaporized products, and and one or more purge gas connections (26) at or near the inlet end to receive an inert, non-condensable gas at a predefined flow rate to maintain the feed material under a positive pressure of >0 kPa and ≤110 kPa, and one or more vapor ports (28) at or near the outlet end;

b) one or more electric heating elements (27) provided in direct contact with an outer surface of the trough portion of said pressure housing to indirectly heat feed material within the pressure housing at a predefined temperature, wherein said one or more electric heating elements are not provided in direct contact with the roof of the pressure housing;

c) a first seal-housing (30) having an inlet (30a), and an outlet (30b) in fluid communication with the inlet end of the pressure housing, and equipped with a first plug screw conveyor (32) for compressing and conveying the feed material towards the outlet of the first seal-housing;

d) a second seal-housing (40) having an inlet (40a) in fluid communication with the outlet end of the pressure housing, and an outlet (40b) for discharging the solid residue, second seal-housing equipped with a second plug screw conveyor (42) for compressing and conveying the solid residue towards the outlet of the second seal-housing; and e) a feeder system (70) in communication with the inlet of the first seal-housing;

wherein the feed material is converted to said one or more vaporized products and the solid residue in the pressure housing, and wherein one or more vaporized products are removed through the one or more vapor ports of the pressure housing, and the solid residue is discharged from the outlet of the second seal-housing.

2. The system of claim 1, wherein said first seal-housing and/or said second seal-housing are equipped with purge gas connections, optionally configured to create a pressure gradient from the inlet end to the outlet end of the pressure housing.

3. The system of claim 1, further comprising an input hopper (50) having an inlet portion (50a) to receive the feed material from the feeder, and an outlet portion (50b) in communication with the inlet of the first seal-housing, said input hopper being configured to continuously or periodically feed the feed material into the first seal-housing, optionally said input hopper being equipped with a pressure regulator.

4. The system of claim 3, wherein the input hopper is equipped with a first knife gate isolation valve at the inlet portion, and a second knife gate isolation valve at the outlet portion, optionally said first and second knife gate valves being configured to alternate in operation.

5. The system of claim 1, further comprising a discharge hopper (60) having an inlet portion (60a) in communication with the outlet of the second seal-housing and an outlet portion (60b) to discharge the solid residue, optionally said discharge hopper being equipped with a pressure regulator.

6. The system claim 5, wherein the discharge hopper is equipped with a first knife gate isolation valve at the inlet portion of the discharge hopper, and a second knife gate isolation valve at the outlet portion of the discharge hopper, said first and second knife gate valves configured to alternate in operation.

7. The system of claim 3, wherein the feeder system (70) comprises a feed screw conveyor housing (72) having an inlet (72a), and an outlet (72b) in communication with the inlet portion of the input hopper, and a feed material feed-receiving hopper (74) in communication with the inlet of the feed screw conveyor housing.

8. The system of claim 1, wherein the first seal-housing is provided with a jacket configured to receive a heating medium or is wrapped with electric heating elements, the jacket and the heating elements configured to pre-heat the feed material at a temperature lower than the predefined temperature of the feed material within the pressure housing.

9. The system of claim 1, wherein the second seal-housing is provided with a jacket configured to receive a cooling medium or is configured to be in contact with a cooling agent to cool the solid residue.

10. The system of claim 1, wherein the system further comprises one or more heat sources for direct heating of the feed material within the pressure housing are selected from one or more hot inert gases being injected into the pressure housing.

11. The system of claim 1, further comprising a vapor recovery system operatively connected with at least one of the one or more vapor ports to receive and condense the one or more vaporized products, said vapor recovery system comprises a direct spray condenser configured to spray water to directly cool the one or more vaporized products.

12. The system of claim 1, wherein said pressure housing is partitioned to form two or more separate temperature zones along its length such that a respective temperature of each successive temperature zone of the two or more separate temperature zones can be maintained at a temperature which is equal to or greater than that of a previous temperature zone of the two or more separate temperature zones.

13. The system of claim 12, wherein the system comprises at least two pressure housings adapted to feed the feed material and/or the solid residue sequentially from one housing to the next housing, and each pressure housing forming one of the separate temperature zones.

14. The system of claim 1, wherein the predefined temperature at which the feed material within the pressure housing is heated is from about 230° C. to about 670° C.

15. The system of claim 1, wherein the pressure housing is sloped downward towards its inlet end by about 0.5 to about 1.0 percent relative to horizontal.

16. The system of claim 1, wherein the one or more purge gas connections are configured to inject a purge gas into the headspace/vapor space of the pressure housing.

17. The system of claim 1, wherein:

the first seal-housing is provided with a jacket configured to receive a heating medium, and configured to pre-heat the feed material at a temperature lower than the predefined temperature of the feed material within the pressure housing; and/or the second seal-housing is provided with a jacket configured to receive a cooling medium to cool the solid residue.

18. The system of claim 17, wherein the heating medium for the jacket of the first seal-housing is the second seal-housing cooling medium after being heated by heat exchange during cooling of the solid residue, and/or wherein the cooling medium for the second seal-housing is the first seal-housing heating medium being cooled during the heating of the feed material.

19. The system of claim 17, further comprising a feed screw conveyor housing provided with a jacket configured to receive a heating medium to pre-heat the feed material to a temperature lower than an operating temperature of the pressure housing, wherein the heating medium for the jacket of the first seal-housing and/or the jacket of the feed screw conveyor housing is the second seal-housing cooling medium after being heated by heat exchange during cooling of the solid residue, and/or wherein the cooling medium for the second seal-housing is the first seal-housing heating medium and/or the feed screw conveyor housing heating medium being cooled during the heating of the feed material.

* * * * *